United States Patent [19]
Harmuth

[11] 3,854,439
[45] Dec. 17, 1974

[54] BOTTLE SPRAYING APPARATUS

[75] Inventor: Joseph T. Harmuth, Greenwich, Conn.

[73] Assignee: Indian Head Inc., New York, N.Y.

[22] Filed: June 21, 1973

[21] Appl. No.: 372,161

[52] U.S. Cl.................... 118/4, 118/70, 118/324, 118/326, 118/500
[51] Int. Cl............................................ B05c 5/00
[58] Field of Search .......... 118/500, 503, 324, 322, 118/4, 70, 326; 279/1 ME, 3; 51/274

[56] References Cited
UNITED STATES PATENTS
| | | | |
|---|---|---|---|
| 2,137,038 | 11/1938 | Ulrich................................ | 118/324 |
| 2,210,187 | 8/1940 | Ross.................................. | 118/500 |
| 3,789,472 | 2/1974 | Pegard......................... | 279/1 ME X |

Primary Examiner—John P. McIntosh
Attorney, Agent, or Firm—Brumbaugh, Graves, Donohue & Raymond

[57] ABSTRACT

A plastic powder spray station is disclosed through which bottles to be spray coated are carried by a continuously moving overhead chain conveyor from which are suspended neck gripping bottle chucks. Cam operated means on a parallel conveyor, driven in synchronism with the bottle conveyor, operates chuck covering means which sense the presence or absence of a bottle in each chuck before entering the spray station, and covers empty chucks to prevent their fouling by sprayed plastic while passing therethrough. The covers are removed by caming means following exit from the spray station.

The foregoing abstract is not to be taken either as a complete exposition or as a limitation of the present invention, and in order to understand the full nature and extent of the technical disclosure of this application, reference must be had to the following detailed description and the accompanying drawings as well as to the claims.

8 Claims, 5 Drawing Figures

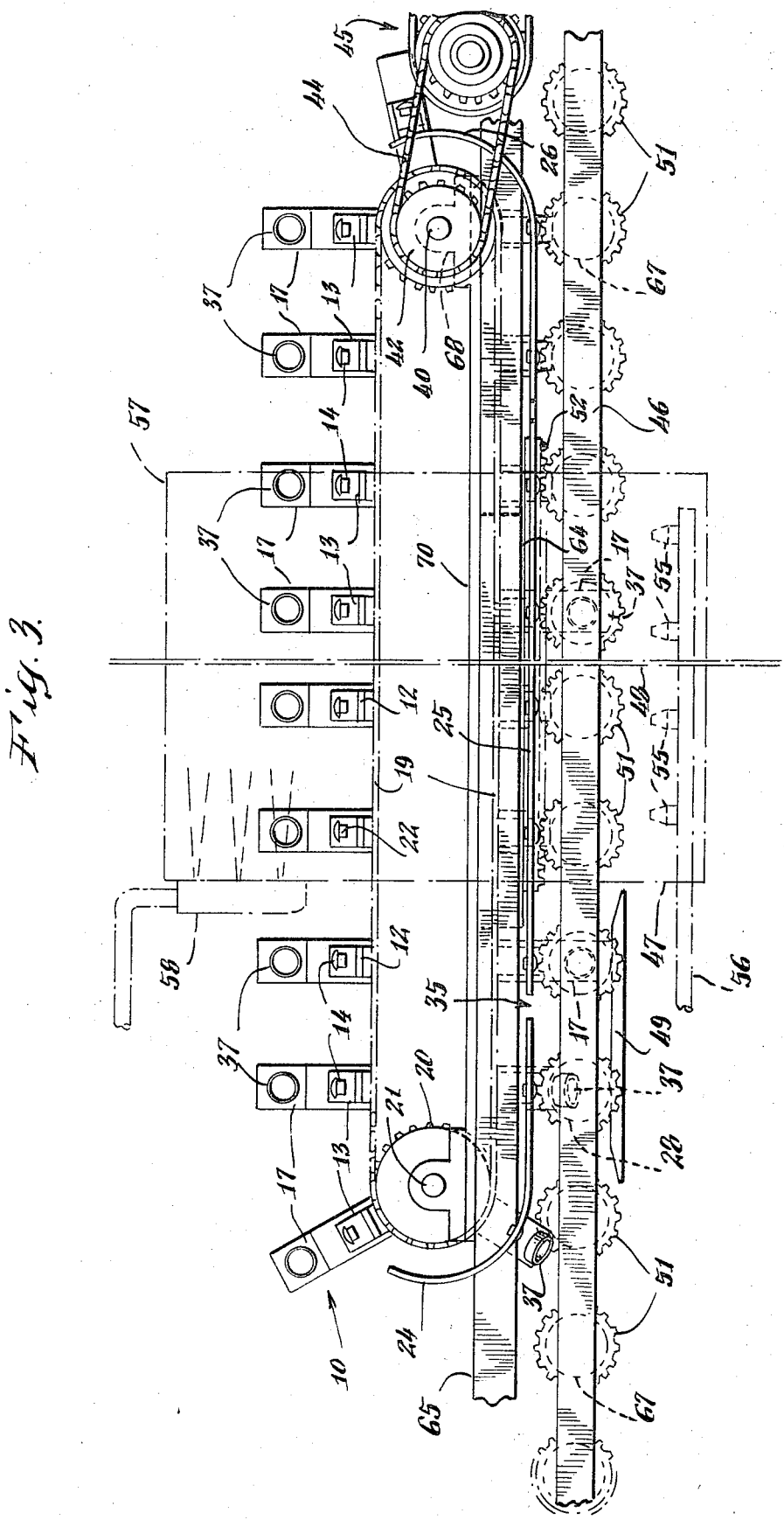

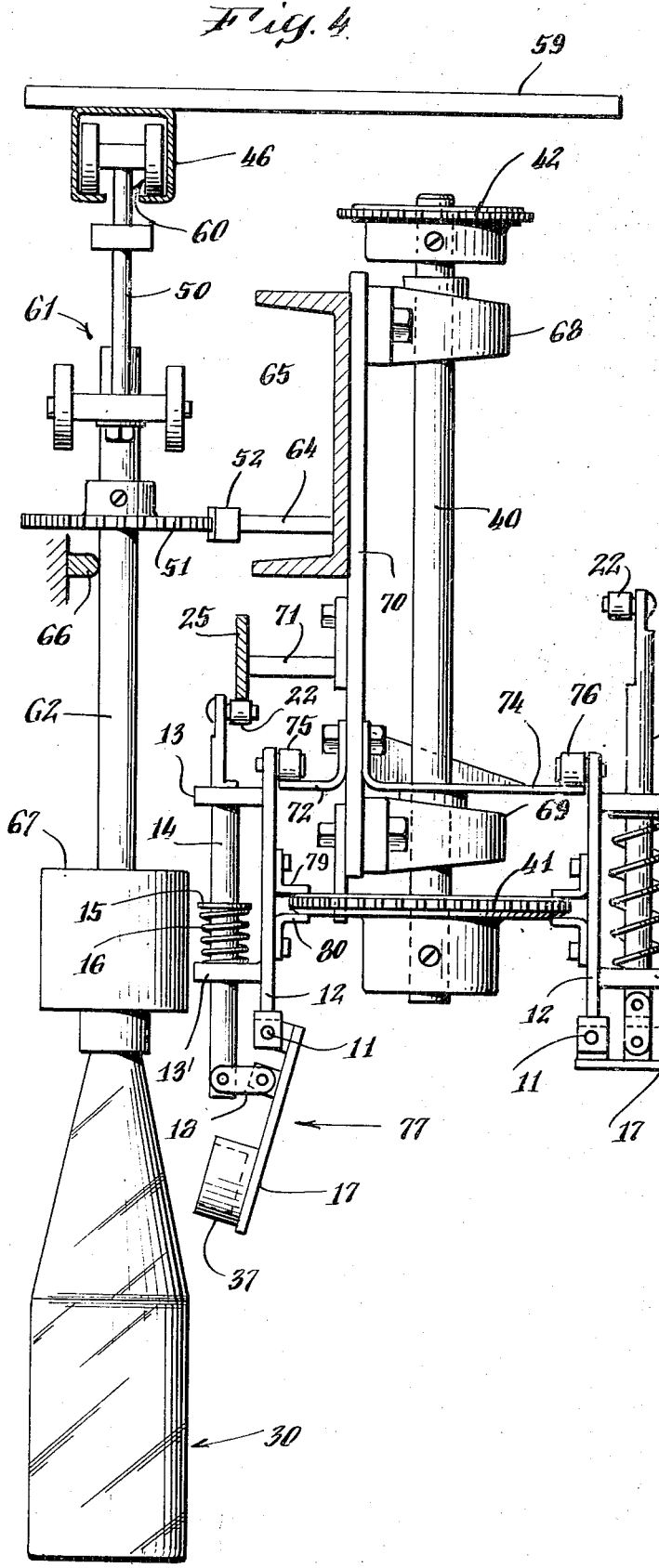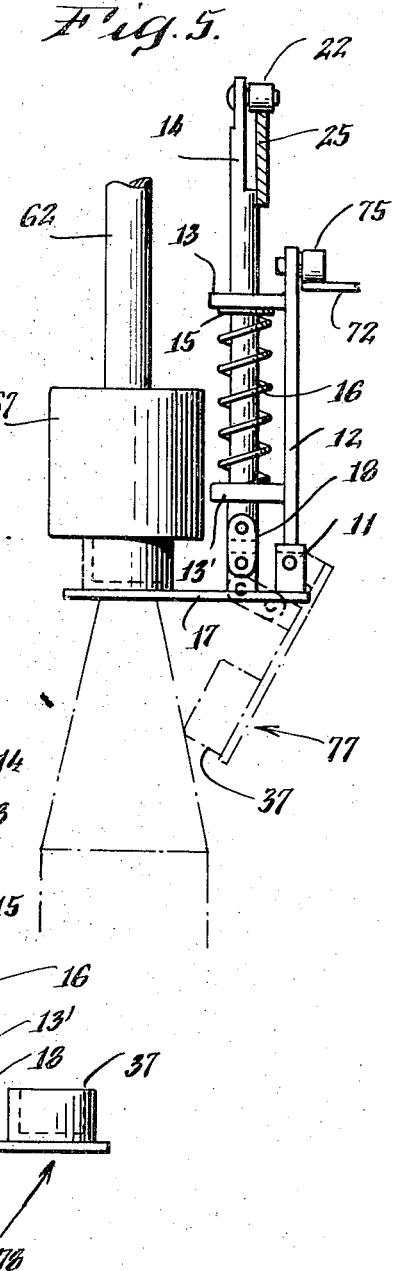

BOTTLE SPRAYING APPARATUS

BACKGROUND OF THE INVENTION

In order to prevent glass containers such as bottles for pressurized beverages from shattering, either due to excessive internal pressures, hidden structural weakness or rough handling, it is recognized as desirable to coat such bottles, before filling, with a thin, tough and transparent plastic film which may be heat shrunk onto the exterior bottle surface. A process for such bottle coating is disclosed in co-pending application of Leo Strauss, Joseph Harmuth and Harry Lundberg, Ser. No. 363,517, filed May 24, 1973, entitled "Resin Bottle Cladding System." Apparatus for carrying out such a process is disclosed in co-pending application of Leo Strauss, Ser. No. 352,682, filed Apr. 19, 1973 entitled "Bottle Conveyor and Positive Lock Spray Shielded Rotatable Bottle Carrier." The disclosures of both said prior applications are expressly incorporated herein by reference thereto. The present invention represents an improvement directed to means for protecting empty bottle chucks while passing through a bottle coating spray station. Such protection is necessary because the process entails spraying bottles held by the overhead chucks with a finely divided resinous powder and then passing the sprayed bottles through an oven where the applied heat fuses the powdered surface into a thin plastic adherent film. The chucks employed to hold the bottles are provided with a protective skirt which shields the chuck mechanism from spray powder, as disclosed in the aforesaid Strauss application Ser. No. 352,682, but if an empty chuck passes through the spray station (as is bound to happen occasionally) powder wil enter the empty chuck mouth and thereafter may be fused by the oven heat thus fouling the moving parts of the chuck and thereby rendering it inoperable to hold a bottle thereafter. To prevent such fouling of empty chucks is the primary objective of the present invention.

Another and more specific object of the invention is to provide means for automatically sensing the presence or absence of a bottle in each chuck of a continuously moving row of chuck held bottles before entering a spray station, and for applying a protective cover to the mouths of those chucks which are found not to contain a bottle.

An additional object is to provide means for moving such protective means in synchronism with and adjacent to a moving row of bottle chucks, and for removing the protective means from empty chucks after passage through a spray station.

An overall object of the invention is to achieve the above objects with means which do not impede or impair the movement and rotation of bottles through a spray processing station, and which cannot contact the exterior surfaces of bottles either while being sprayed or after emerging from the processing station.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 3 is a top plan view of the apparatus shown in FIG. 2;

FIG. 4 is an enlarged vertical end view taken along the line 4—4 of FIG. 2; and

FIG. 5 is an enlarged detail view showing a protective cover in closed engagement over the bottom of an empty chuck.

DETAILED DESCRIPTION

Figure 1:
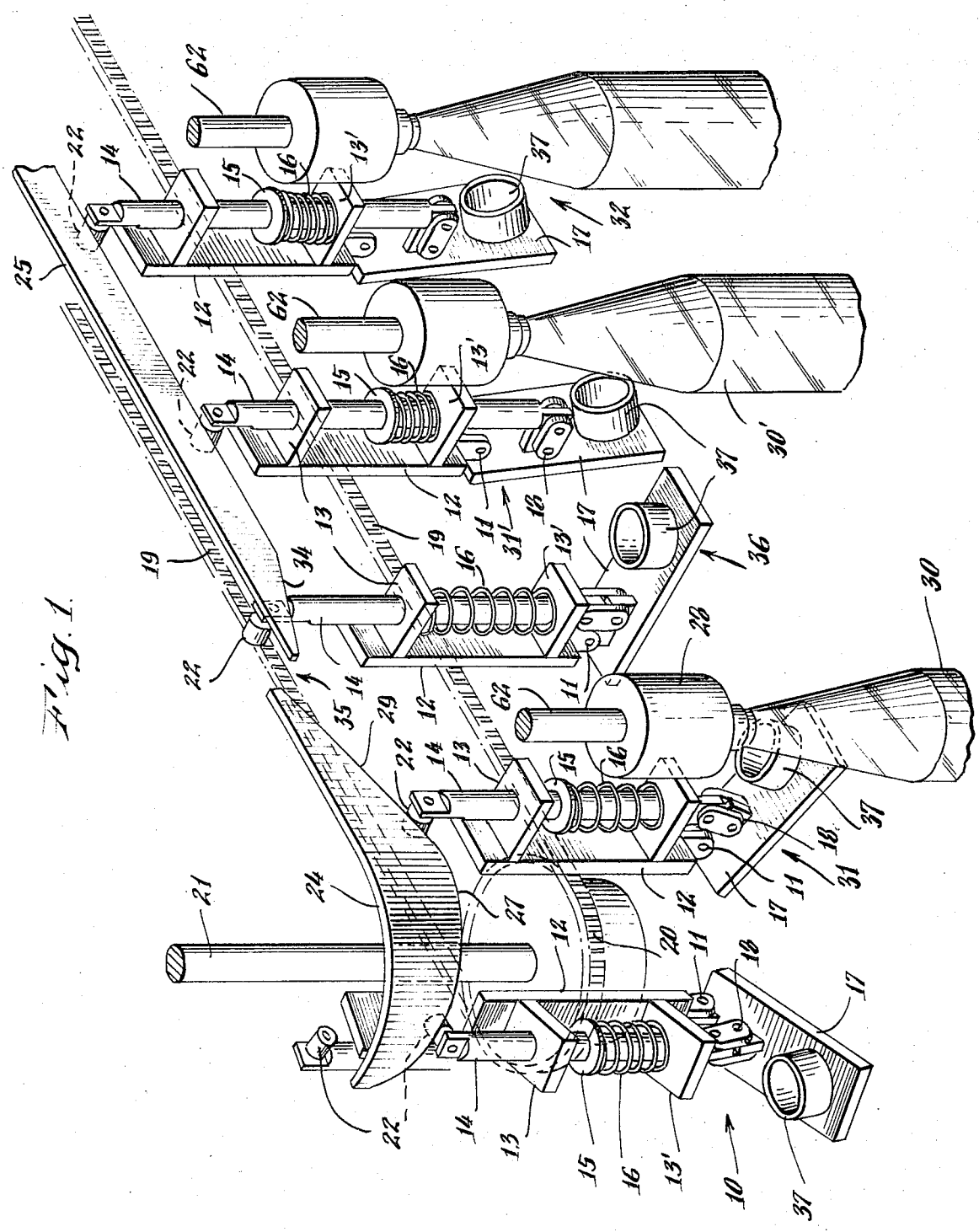
FIG. 1 is a perspective view of apparatus according to a preferred embodiment of the invention.

Referring first to FIG. 1 of the drawings, which is a perspective detail view with some parts broken away and others omitted for clarity, the essential operating elements are disclosed as a plurality of hinge mounted chuck covers indicated generally at 10. Each chuck cover 10 is swingably mounted on the horizontal axis of a hinge 11 which is affixed to the bottom edge of a vertical plate 12. Each vertical plate 12 is mounted on and carried by a horizontally moving conveyor chain 19 (here shown by broken lines). The conveyor chain 19 passes around a sprocket wheel 20 mounted on a vertical rotating shaft 21. Mounted on vertical plate 12 are a pair of vertically aligned bearings 13–13' through which passes a vertically reciprocal shaft 14 to which is affixed a spring retaining washer 15. Between washer 15 and lower bearing plate 13' is a compression spring 16 which exerts a vertical force on shaft 14. A hinged chuck cover plate 17 is connected by a flexible link coupling 18 to the lower end of vertically reciprocal shaft 14. The upper end of shaft 14 carries a cam follower 22 which is preferably in the form of a nylon roller as shown.

Figure 2:
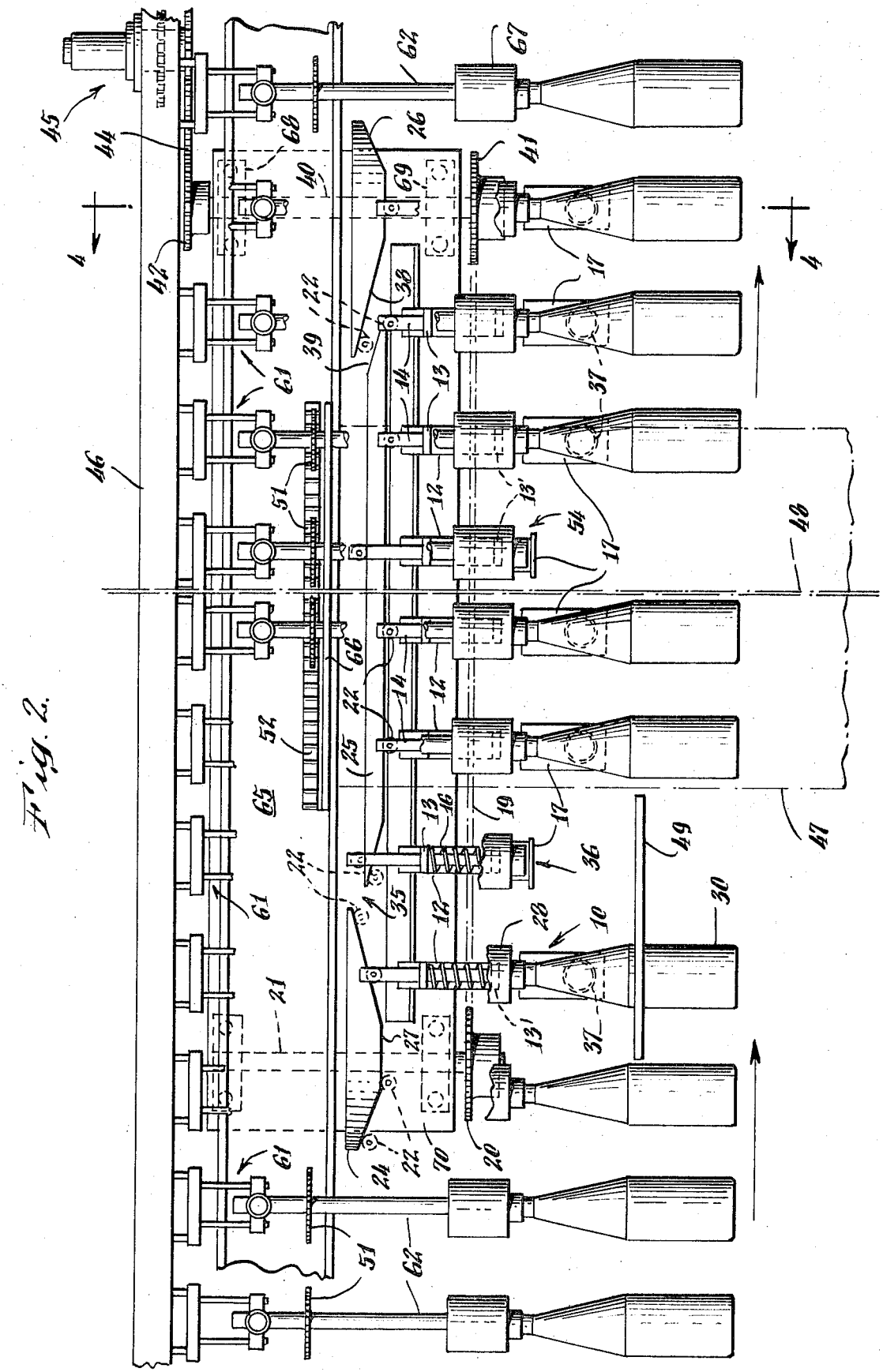
FIG. 2 is a front elevational view of the apparatus shown in FIG. 1.

Rigidly supported overhead (by means shown in FIG. 2 and FIG. 4) are a plurality of cam members 24 and 25 with which cam followers 22 engage, as the chain 19 carries the members 12 from left to right, in the direction shown by the arrows in FIGS. 1, 2 and 3. Cam 24 is curved around a radius having the axis of shaft 21 as its center and serves to condition the position of chuck covering plate 17 prior to entry into the spray station. A similar curved cam 26 (FIG. 2) on the exit side of the spray station serves to remove the chuck covering means after the spraying operation is completed. As the chuck covering means indicated generally at 10 is moved by chain 19 around sprocket wheel 20 the cam follower 22 engages the downwardly sloping bottom edge of cam 24 as shown to the left in FIG. 1. Further movement from left to right depresses spring loaded vertical shaft 14, thereby swinging cover plate 17 downwardly, until follower 22 rides under the lowermost portion 27 of cam 24 at which position plate 17 is depressed into a substantially vertical position. At this point the moving line of chucks, most of which are carrying bottles, moves synchronously into parallel proximity with the adjacent chuck cover means. At the position shown by chuck 28 the cam follower 22 has begun to ride up on the rising surface 29 of cam 24 under the influence of compression spring 16, allowing the cover plate 17 to swing upwardly until it engages a bottle suspended from chuck 28. Presence of bottle 30 in chuck 28 prevents any further elevation of plate 17, and thus the chuck cover mechanism indicated generally at 31 remains in the same semi-depressed condition with respect to chuck 28 and bottle 30 as shown in FIG. 1. As the mechanism 31 continues to move from left to right, propelled by chain 19, the cam follower 22 engages the lower sloping surface 34 of cam 25 whereby further movement to the right produces further and total depression of the vertical shaft 14, thereby causing the chuck cover plate 17 to swing down and away from contact with the bottle 30' as shown by the position of the mechanism as indicated generally at 31'. In this condition the chuck held bottles are free and clear of the hinged chuck cover members and are ready to enter the spray station as shown at 32 in FIG. 1.

Still referring to FIG. 1, if the chuck 28 upon reaching the position indicated generally at 31 is empty, i.e., if a bottle 30 is not present in chuck 28, then the cam follower 22 is free to continue riding up on the sloping surface 29 of cam 24 under the force of compression spring 16. Upon reaching the transition gap 35 between cams 24 and 25 the cam follower 22 will then ride over the top horizontal surface of cam 25 as shown by 22' in FIG. 1. This condition locks the cam cover plate in its uppermost horizontal position as shown generally at 36. It is to be understood that an empty chuck will now be at the position 36 with its empty jaws completely covered, but for the sake of clarity in illustration this chuck has been omitted from the drawing in the perspective view of FIG. 1. For complete coverage, to afford maximum protection to the empty chuck jaws when entering the plastic spray booth, a hollow cylindrical collar 37 is mounted on the cover plate 17 as shown in FIG. 1. However, in a system employing well protected bottle chucks wherein only a very small tip of the chuck protrudes from the bottom of a surrounding protective skirt, as disclosed in the aforesaid application Ser. No. 352,682, the collars 37 may be omitted as the flat cover plate 17 will provide all the protection needed for the exposed chuck mouth. After the bottle carriers have passed through the spray station another curved cam at the opposite end, similar to cam 24, removes the chuck covers as the sprayed bottles (and any empty bottle chucks) proceed on to other stations of the processing line.

Referring now in greater detail to FIG. 2 of the drawings, which is a front elevational view of the chuck covering mechanism described above, a second curved cam 26 at the righthand exit end of the line has a downward sloping bottom surface 38 which extends over a downward sloping top surface 39 of horizontal cam 25. As the cam followers such as 22' which are riding on the upper surface of cam 25 (in association with empty bottle chucks) ride down the sloping surface 39 they become engaged under the bottom surface 38 of exit cam 26 which further depresses the vertical shafts 14 to swing the chuck covers downwardly into a substantially vertical position. Similarly, those cam followers which are already depressed by the bottom edge of cam 25 at this point engage the bottom surface of cam 26 and are further depressed as they ride under the lowermost surface of cam 26. It is to be understood that cam 26 is curved in the horizontal direction around a radius having the axis of vertical shaft 40 as its center, in the same manner as cam 24 is curved around the axis of sprocket shaft 21. Sprocket wheels 41 on shaft 40, and 20 on shaft 21 support and drive chain 19 which moves all of the chuck covering means from left to right. An upper sprocket wheel 42 splined to shaft 40 is coupled by a chain 44 to a main drive indicated generally at 45 which drives the chain 19 in synchronism with the main overhead carrier chain in channel 46. Synchronous drive may be achieved either by direct mechanical coupling as shown, or by an electrical synchro-drive if preferred.

Still referring to FIG. 2 of the drawings, a spray station indicated generally by broken lines at 47 may normally contain six to twelve bottles at a time, depending upon the speed of the conveyor line, the size of bottles and the characteristics of the material being sprayed thereon. To conserve space and enable larger scale depiction in the drawing of FIG. 2 the spray station 47 is interrupted at its center by broken lines 48, showing only the entrance side thereof to the left and the exit side to the right of lines 48. Outside the entrance to spray station 47 a horizontal guide bar 49 spans the path traversed by bottles in the positions indicated generally at 31 and 36 for the purpose of preventing bottles thereat from swinging forwardly (i.e., toward the viewer of FIG. 2) when these bottles are initially engaged by the spring loaded chuck covers. It will be recalled from the above description of FIG. 1 that it is at position 31 where the chuck cover plate 17 rises to sense whether or not a bottle 30 is present in chuck 28. If no bottle is present the chuck cover continues to swing upwardly to completely cover the empty chuck as shown at 36. If a bottle is sensed to be present, the cam follower engages the lower side of cam 25 and depresses the chuck cover until it is completely free from contact with its adjacent bottle and the bottles may then be freely rotated upon their entry into spray station 47. Mounted on the upper portion of each chuck supporting shaft such as 50 in FIG. 2 is a sprocket wheel 51 which engages a horizontal toothed rack 52 at the spray station 47 whereby the chucks and bottles carried thereby are rotated about their vertical axes to achieve a uniform deposit of material sprayed thereon. An empty chuck designated generally at 54 within the spray station 47 is shown covered to protect the chuck mechanism from becoming fouled by the sprayed material as it passes through the spraying booth.

Reference is now had to FIG. 3 of the drawings which is at top plan view corresponding to FIG. 2. Here it may be seen that a plurality of bottles, such as indicated by the reference numeral 30, approach the spray station 47 in a straight line suspended from overhead conveyor 46 and they move continuously at a constant rate of travel from left to right into and through spray station 47. As bottles 30 approach the horizontal guide bar 49 the chuck cover plates such as 10 which are moving in synchronism with the bottle conveyor come around the bend under curved cam plate 24 and are brought into aligned engagement with the bottle conveyor chucks. Those chucks which may be empty are covered, while the bottles contained in chucks are disengaged from the chuck cover members before entry into the spray station as described above. A plurality of spray nozzles 55 within spray station 47 are supplied with suitable plastic material under pressure via a pipe line 56. Upon entering the spray station the bottles are caused to rotate about their vertical axes by engagement of sprocket wheels 51 with stationary rack 52. As sprayed bottles exit from the spray station 47, they continue to move in a straight line to the right as viewed in FIG. 3 while the disengaged chuck covers move counterclockwise around the bend of cam plate 26 toward the back side of spray station 47 where they then move from right to left, as indicated by the upper arrow in FIG. 3, and are then passed through a powder recovery section 57 at the rear of spray station 47 before returning to engagement with entrance cam 24. At the downstream left end of powder recovery section 57 an air blower 58 is provided to blow off any residual plastic powder which may have accumulated on the surfaces of the chuck cover members so that they are completely free of any such matter before they again enter the spray station 47. Means (not shown) are provided for returning recovered excess powder from recovery section 57 to the supply source connected with spray line 56.

Reference is now made to FIG. 4 of the drawings which is an enlarged view taken along the line 4—4 of FIG. 2, showing in greater detail the construction and relation of the essential parts of the apparatus. The main conveyor channel 46 is mounted on a rigid overhead support 59 and carries within it an articulated conveyor chain preferably supported on ball bearing rollers as indicated at 60. Vertical suspension means indicated generally at 61, and described more fully in the aforesaid co-pending application Serial No. 352,682 the disclosure of which is incorporated herein by reference, supports a rotatable vertical shaft 62. The sprocket wheel 51, secured to the upper end of rotatable shaft 62, engages horizontal rack 52 which is mounted by means 64 to a rigid horizontal channel support 65. A horizontal back-up bar 66 which extends for the length of rack 52 (as shown in FIG. 2) bears against rotatable shaft 62 to prevent any lateral swinging of the suspension system 61–62 and thereby assures continuous engagement between sprocket wheel 51 and rack 52 whereby rotation is imparted to the chuck supporting shaft 62. A neck gripping bottle chuck 67 is preferably of the type disclosed in the aforesaid application Ser. No. 352,682, although the apparatus of the present invention may be employed with other types of bottle chucks as well. Channel member 65 also has mounted to it a vertical plate 70 which supports, via bearings 68 and 69, rotatable vertical shaft 40 which has sprocket wheel 41 mounted on its extending lower end and sprocket wheel 42 mounted on its upper end which is driven as described hereinabove with reference to FIG. 2 of the drawings. Plate 70 also mounts cam 25 via supporting studs 71, as well as supporting angle brackets 72 and 74 which are bolted to opposite faces of vertical plate 70. The outer edge of the upper surfaces of brackets 72 and 74 serve as load bearing tracks for rollers such as 75 and 76 which ride thereon and carry the weight of the chuck covering mechanisms indicated generally at 77 and 78. Each of these load bearing rollers such as 75 supports a vertical plate such as 12, having mounted thereon aligned vertical bearings such as 13–13' through which pass vertically slidable shafts such as 14. On each shaft 14, between bearings 13–13' is an annular spring retaining shoulder 15 beneath which is positioned a compression spring 16 the bottom end of which rests upon the upper surface of bearing 13'. The upper end of each of the shafts 14 carries a cam follower 22. A pair of angle brackets 79–80 mounted on each vertical plate 12 as shown in FIG. 4 are also secured to links in chain 19 whereby cam cover members such as 77 and 78 are transported in a horizontal direction.

It is to be understood that the flanges of angle brackets 72 and 74 join each other at their ends and form therebetween a semi-circular track having the axis of shaft 40 as a center, as shown in FIG. 3 of the drawings. Similarily flanges 72 and 74 are joined at the left end in FIG. 3 to form a semi-circular track beneath curved cam 24, having the axis of shaft 21 as its center. It is also to be understood that the curved end cam plates 24 and 26 (FIGS. 1, 2 and 3) are mounted onto vertical plate 70 by radial extending studs (not shown) similar to studs 71 supporting straight cam 25. The condition illustrated by the detail drawing of FIG. 4 shows a bottle 30 just exiting from the spray station 47 (FIGS. 2 and 3) with the chuck cover 77 distended away from engagement with the bottle surface, while directly opposite, on the back side of the chuck cover conveyor 19, a cover member 78 is in its spring loaded elevated position on its return trip to the starting bend at cam 24.

FIG. 5 is a partial detail drawing similar to FIG. 4 showing in broken lines the condition that prevails when a chuck cover initially encounters a bottle (as at station 31 in FIG. 1). The solid lines in FIG. 5 show the condition that prevails when no bottle is sensed and the chuck cover swings all the way up to completely cover the empty chuck.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. In a continuous production line system for spraying articles supported by a plurality of moving chuck conveyors, protective means for automatically covering empty chucks comprising in combination, a first conveyor line carrying a plurality of uniformly spaced chucks at predetermined intervals, means for moving said first line at a constant rate of traverse, a second conveyor line extending a selected distance parallel and adjacent to said first line, means for moving said second line in synchronism with said first line, a plurality of hinged cover members mounted on said second conveyor line at uniformly spaced intervals corresponding to said predetermined chuck intervals, each of said hinged cover members adjacent one of said chuck members through out said selected distance, and cam operated means connected to each of said hinged cover members for controlling movement of said hinged members into protective covering engagement with an adjacent empty chuck.

2. The combination of claim 1 wherein said hinged members are spring biased into chuck covering position and said cam means operate said hinged members into disengaging uncovering position when an article is contained in an adjacent chuck.

3. The combination of claim 1 including a plurality of stationary cams engageable with a cam follower on each of said cover means as said second conveyor line traverses said selected distance.

4. The combination of claim 3 wherein a first one of said cams initially operates on said cam followers to move said hinged members into open uncovering condition and subsequently operates on said followers to move said hinged members into article sensing condition, and a second one of said cams operates on said followers to restore said hinged members to open uncovering condition when the presence of an article is sensed in an adjacent chuck.

5. The combination of claim 1 and means for returning said second conveyor line from the end of said selected distance traverse to the starting position thereof.

6. In an automatic container spraying system wherein a plurality of containers are individually suspended by chuck gripping means from a moving overhead conveyor and are carried thereby through a spray booth, means for protectively covering any of said chuck gripping means which do not hold a container prior to entry thereof into the spray booth, and protective covering means comprising in combination individual hinged members positioned adjacent each of said chuck means prior to entry into a spray booth; said hinged members swingable between a disengaged position, a container sensing position and a chuck covering position respectively; means for moving said hinged members laterally parallel adjacent to and in synchronism with movement of said chuck means into and through said spray booth, cam follower means on each of said hinged members and engageable with a plurality of cam surfaces as said members move laterally, a first one of said cam surfaces operating on said cam follower means to swing said hinged members into disengaged position, a second adjacent cam surface operating on said follower means to swing said hinged members into container sensing position, and a third cam surface operating upon said follower means upon the sensing of a container to disengage said hinged member and upon the sensing of no container to swing said hinged member into its chuck covering position.

7. The combination of claim 6 and an additional cam surface operable on said follower means after exit from said spray booth to move said hinged members into their disengaged position; and further means including a closed loop conveyor for returning said disengaged members from the exit side of said spray booth to the entrance side thereof.

8. The combination of claim 7 wherein said further means comprises means for cleaning said disengaged members during their return traverse from the exit to the entrance of said spray booth.

* * * * *